United States Patent [19]

Shechter

[11] Patent Number: 5,043,949

[45] Date of Patent: Aug. 27, 1991

[54] DATA SIGNAL TRANSMISSION CABLE AND METHOD

[75] Inventor: Zvi Shechter, Houston, Tex.

[73] Assignee: Halliburton Geophysical Services, Inc., Houston, Tex.

[21] Appl. No.: 366,832

[22] Filed: Jun. 15, 1989

[51] Int. Cl.⁵ .............................................. G01V 1/22
[52] U.S. Cl. .......................................... 367/76; 375/3
[58] Field of Search ...................... 367/20, 76, 78, 154, 367/81; 340/853, 857; 370/75, 35; 375/3, 4; 455/7, 14, 15, 16

[56] References Cited

U.S. PATENT DOCUMENTS

| | | | |
|---|---|---|---|
| 3,457,508 | 7/1969 | Rowlands et al. | 375/3 |
| 4,072,923 | 2/1978 | Siems et al. | 367/78 |
| 4,092,629 | 5/1978 | Siems et al. | 367/79 |
| 4,117,448 | 9/1978 | Siems | 367/79 |
| 4,523,191 | 6/1985 | Cretin et al. | 367/20 |

Primary Examiner—Ian J. Lobo
Attorney, Agent, or Firm—E. Harrison Gilbert, III

[57] ABSTRACT

A data signal transmission cable particularly adapted for use in seismic prospecting permits high speed digital data transmission. In a preferred embodiment, the cable includes a transceiver at each end and two repeaters located near the center of the cable for differentiating and retransmitting signals transmitted from respective ends to opposite respective ends. Each repeater is energized from the end from which it receives transmitted data. A preferred method permits communicating seismic data signals over two serial pairs of twisted metallic wires.

14 Claims, 7 Drawing Sheets

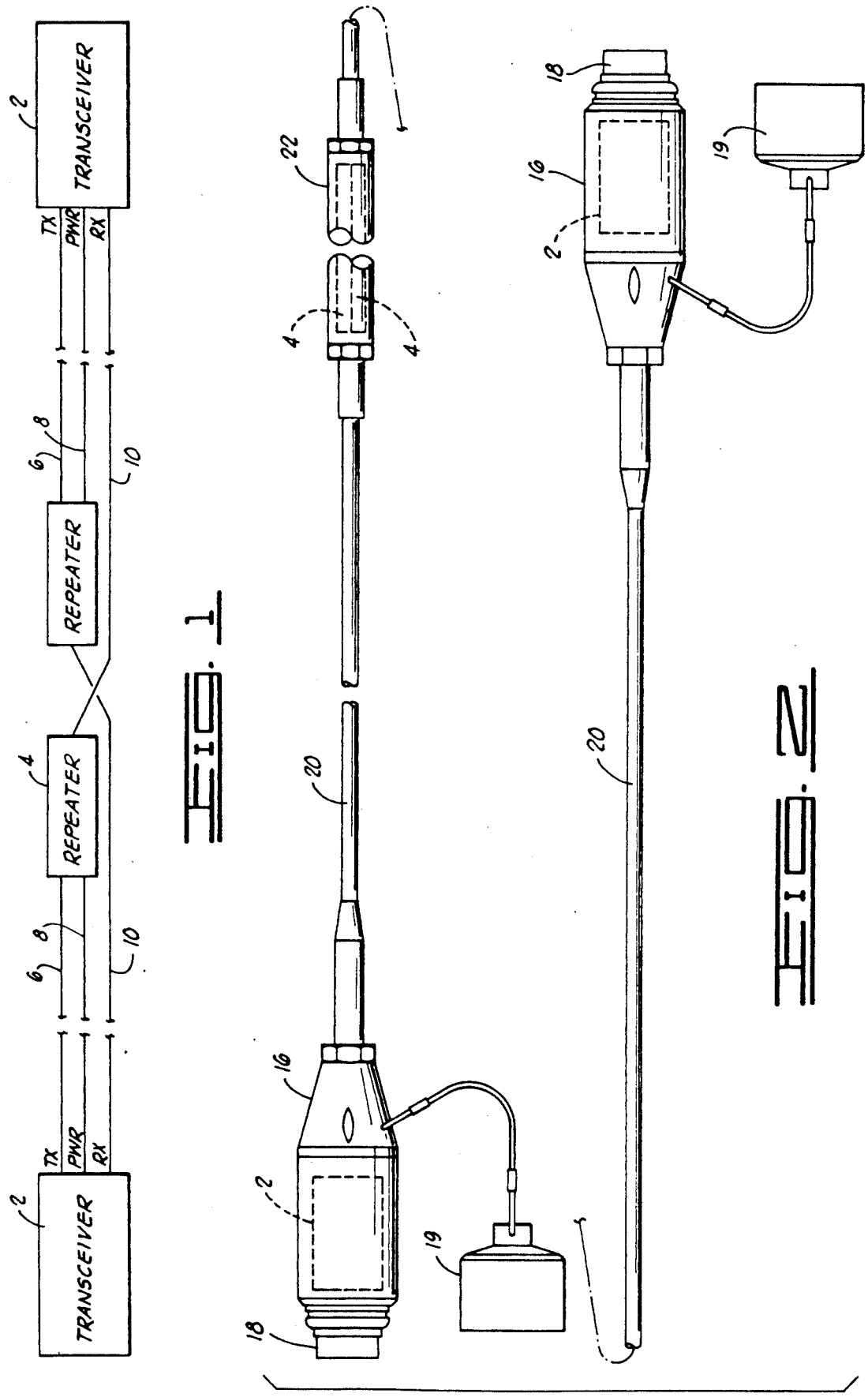

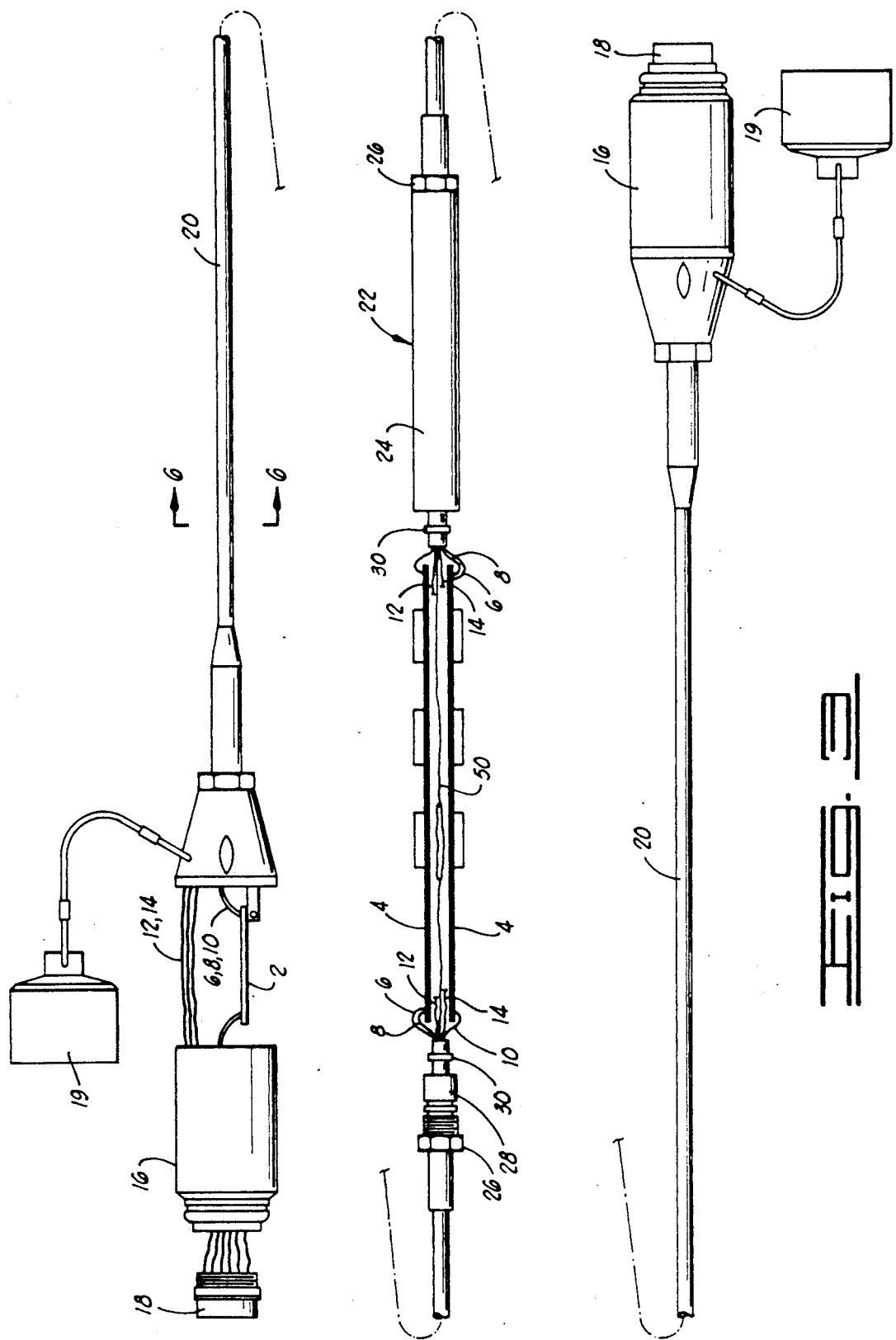

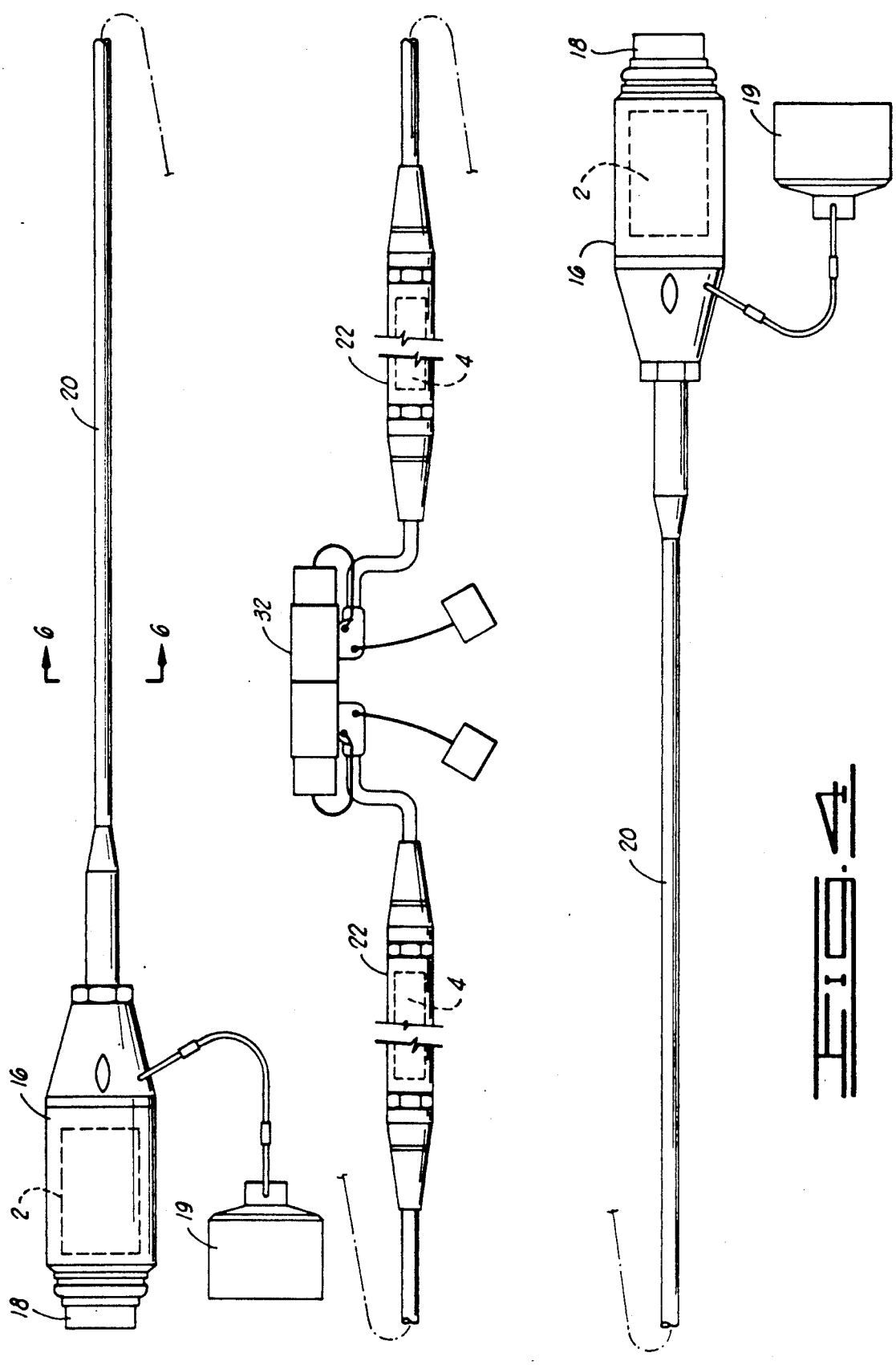

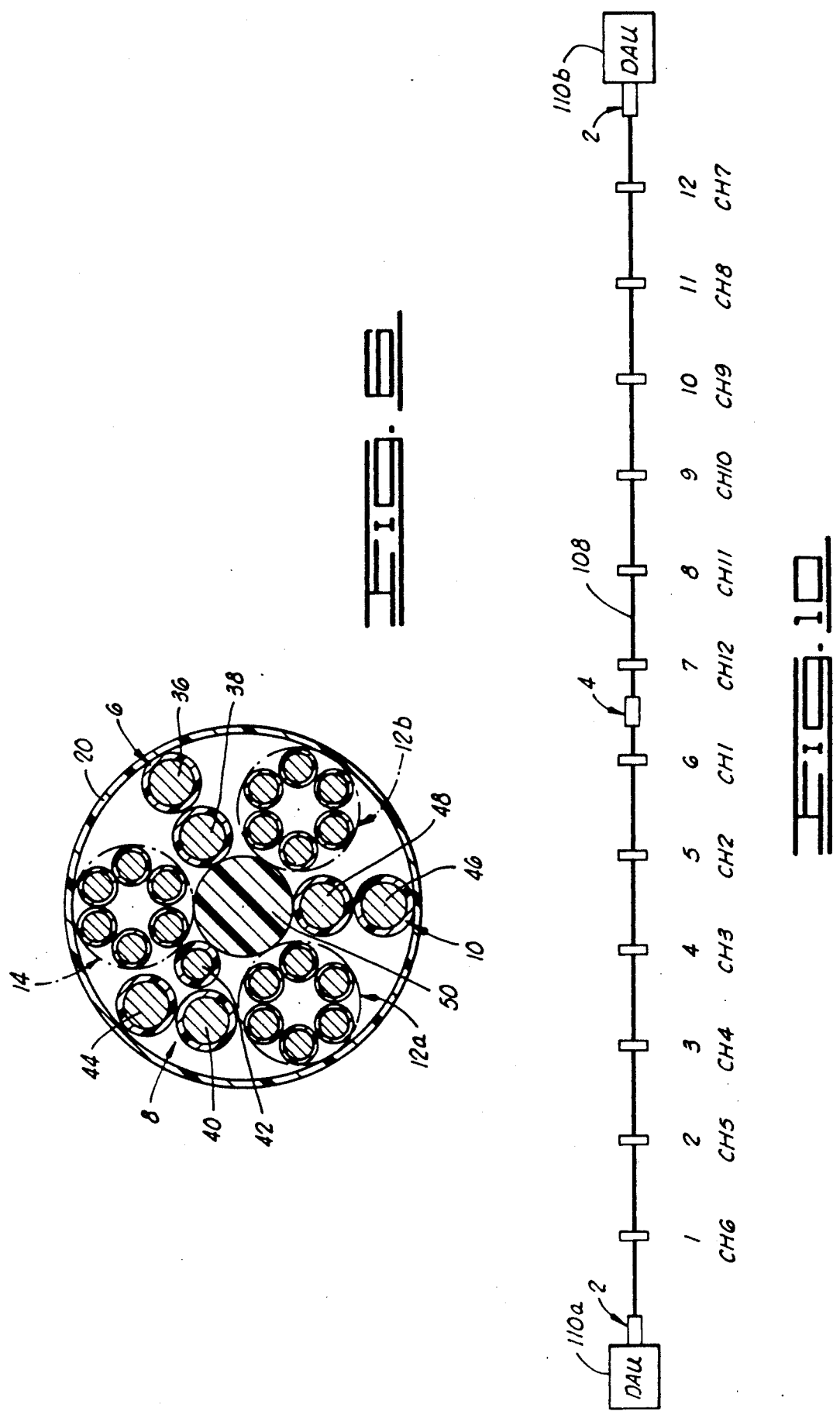

DATA SIGNAL TRANSMISSION CABLE AND METHOD

BACKGROUND OF THE INVENTION

This invention relates generally to data signal transmission cables and methods and particularly to ones adapted for use in seismic prospecting. The invention relates even more particularly, but not by way of limitation, to a seismic telemetry method and wire cable with integral repeaters.

Seismic data can be useful to a person, such as a geologist, who analyzes subterranean formations in prospecting for oil and gas. Vibrations, or elastic waves, are generated in the earth by artificial means, such as explosives. Vibration detecting devices, called geophones, located in the area of interest pick up vibrations after they have passed through the subterranean formations. The geophones convert the detected vibrations to analog electrical signals which can be analyzed by known techniques to reveal characteristics of the subterranean formations.

Before the seismic data derived from the geophones can be analyzed, however, it must be converted to a form which can be understood by the analyst. Analog systems were first used to make this conversion. These converted the analog signals from the geophones into a strip chart graphical presentation, for example. More recently, digital systems have also been used. These digital systems typically have at least one data acquisition unit which receives analog signals from a number of geophones, converts them to digital format, and transmits the digital signals to a central processing unit. An example of a system utilizing data acquisition units and a central processing unit is the Halliburton Services' DFS-7 digital field system.

Speed is an advantage of the digital systems. Metallic wire cables have been used to connect data acquisition units with other data acquisition units and the central processing unit. Although the data acquisition units and the central processing unit can operate at higher speeds, transmission speeds over these metallic wire cables have been limited to about 4 megahertz because of the distances over which the data are typically transmitted. That is, the inherent impedance of the metallic wire cables significantly attenuates higher frequency signals over typical transmission distances. This inherent shortcoming of metallic cables has been overcome by fiber optic cables; however, the higher transmission speed advantage of fiber optic cables is at least partially offset by shortcomings of the fiber optic cables compared to metallic wire cables. These shortcomings include higher cost, lower trade acceptance, and physical deficiencies arising from the field environment where seismic prospecting is done.

There is, therefore, the need for a data signal transmission cable and method which are specifically applicable to seismic prospecting wherein digital equipment is used and which overcome the aforementioned shortcomings of prior metallic wire cables and fiber optic cables.

SUMMARY OF THE INVENTION

The present invention overcomes the above-noted and other shortcomings of the prior art by providing a novel and improved data signal transmission cable and a novel and improved data signal transmission method. In a preferred embodiment, the present invention allows for transmission speeds in excess of 4 megahertz even though metallic wires are used as the conductive medium. Thus, this preferred embodiment does not use a novel or different conductive medium which might meet with industry reluctance or have other offsetting shortcomings such as has happened with fiber optic cables used in seismic prospecting. A particular embodiment of the present invention can transfer digital data signals at 8.192 megahertz for up to at least 660 meters.

In one embodiment, the data signal transmission cable of the present invention comprises: a data signal transmitter; a data signal repeater; data signal conductor means for conducting data signals from the transmitter to the repeater; and power conductor means for conducting electricity from the transmitter to the repeater to energize the repeater. In a particular embodiment adapted for use in seismic prospecting, the data signal transmission cable further comprises: seismic signal conductor means, extending between the ends of the cable, for connecting to a plurality of geophones along the length of the cable; and telephone signal conductor means, extending between the ends of the cable, for providing a telephone circuit line between the ends of the cable.

A data signal transmission cable of the present invention is also defined as comprising: a first pair of conductors; a second pair of conductors; a third pair of conductors; a fourth pair of conductors; first transmitter means, disposed at a first end of the cable and connected to the first pair of conductors, for transmitting data signals over the first pair of conductors; first repeater means, connected to the first and second pairs of conductors, for receiving data signals from the first pair of conductors and for transmitting over the second pair of conductors in response to received data signals; first receiver means, disposed at a second end of the cable and connected to the second pair of conductors, for receiving data signals transmitted from the first repeater means; second transmitter means, disposed at the second end of the cable and connected to the third pair of conductors, for transmitting data signals over the third pair of conductors; second repeater means, connected to the third and fourth pairs of conductors, for receiving data signals from the third pair of conductors and for transmitting over the fourth pair of conductors in response to received data signals; and second receiver means, disposed at the first end of the cable and connected to the fourth pair of conductors, for receiving data signals transmitted from the second repeater means.

The present invention also provides a data signal transmission method commensurate with the foregoing definitions of the apparatus of the present invention. In a particular embodiment, however, the present invention provides a method of communicating seismic data signals over two serial pairs of twisted metallic wires having a combined length of up to at least 660 meters. This method comprises transmitting seismic data signals from one end of a first of the two pairs of twisted metallic wires at a frequency of 8.192 megahertz; differentiating the transmitted seismic data signals through a differentiating circuit located near the middle of the combined length at the other end of the first of the two pairs of twisted metallic wires; retransmitting seismic data signals at 8.192 megahertz onto one end of the second of the two pairs of twisted metallic wires for communication to the other end of the second of the two pairs, which retransmitting includes driving transistors, which are connected to the differentiating circuit and the second of the two pairs of twisted metallic wires, with the differentiated seismic data signals.

Therefore, from the foregoing, it is a general object of the present invention to provide a novel and improved data signal transmission cable and a novel and improved data signal transmission method. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 is a block diagram of a data signal transmission cable of the present invention.

FIG. 2 is an illustration of an external view of a preferred embodiment of the data signal transmission cable depicted in FIG. 1.

FIG. 3 is an illustration of the cable shown in FIG. 2, but also illustrating internal components thereof.

FIG. 4 is an illustration of an external view of another preferred embodiment of the data signal transmission cable depicted in FIG. 1.

FIG. 8 is a schematic circuit diagram of a preferred embodiment of a receiver forming a part of either of the embodiments shown in FIGS. 2-5.

FIG. 10 is a schematic illustration of a data signal transmission cable of the present invention having a specified length and adapted for receiving up to 12 geophone connections.

DETAILED DESCRIPTION OF PREFERRED EMBODIMENTS

Figure 5:
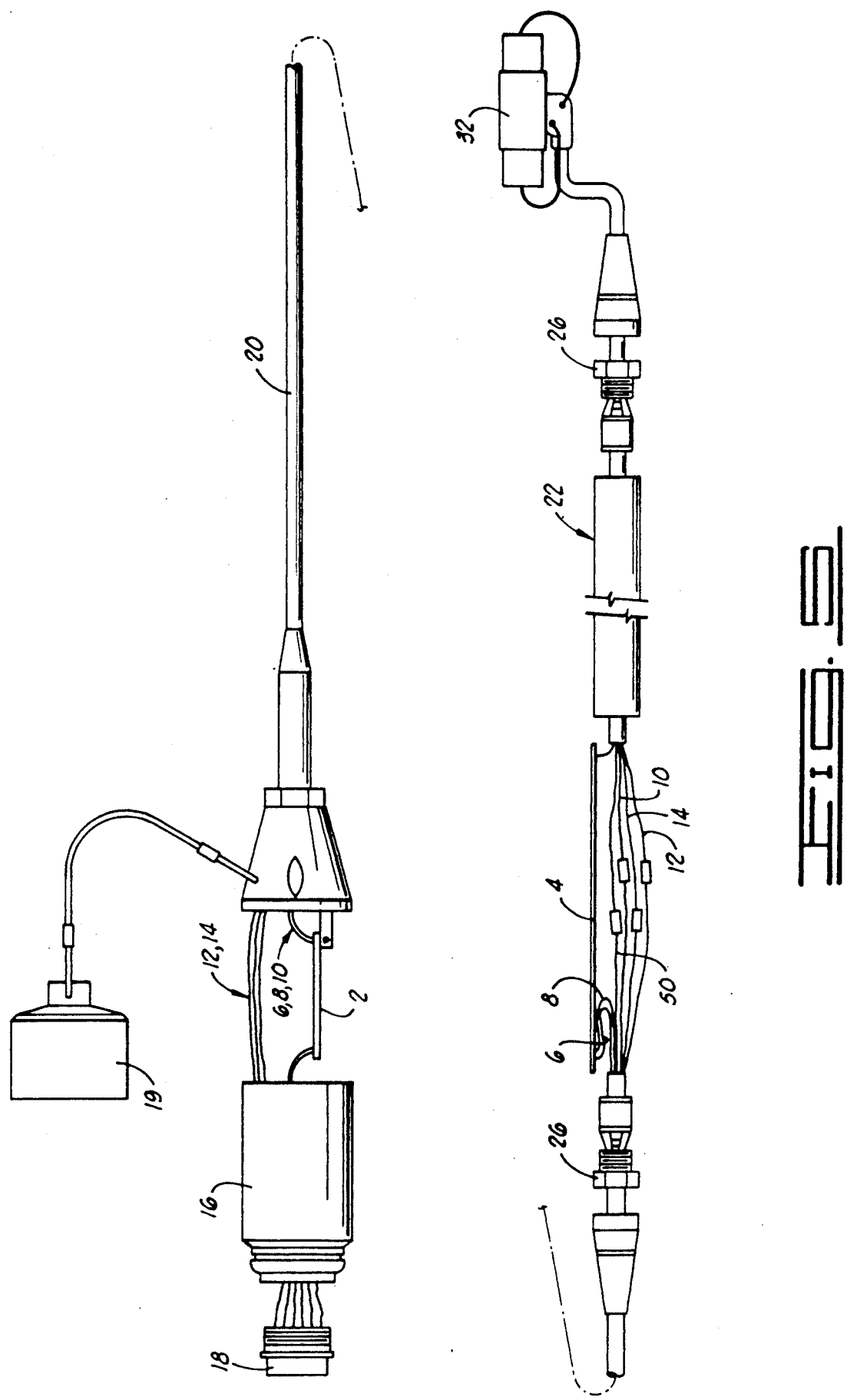
FIG. 5 is an illustration of the cable shown in FIG. 4, but also illustrating internal components thereof.

A data transmission cable in accordance with the present invention is depicted in FIG. 1. The cable depicted in FIG. 1 is bidirectional in that data (e.g., informational or control encoded signals) can be transmitted and received at either end. To accomplish this, the cable has a data signal transceiver 2 at each end and two data signal repeaters 4 located at the center of the cable (like elements are identified by the same reference numerals throughout the drawings). Each transceiver 2 includes a respective data signal transmitter and a respective data signal receiver to be more fully described hereinbelow. The data signal transmission cable further comprises data signal conductor means 6 for conducting data signals from a transmitter of one of the transceivers 2 to one of the repeaters 4 as illustrated in FIG. 1. The cable also includes power conductor means 8 for conducting electricity from the respective transmitter to the respective repeater 4 to energize the repeater 4. The cable also includes data signal conductor means 10 for conducting data signals from the respective repeater 4 to the receiver of the opposite transceiver 2. The serial combination of the conductor means 6 and the conductor means 10 for a respective repeater 4 is sometimes referred to herein as a data transmission line.

Data signals are transmitted from the transmitter of the transceiver 2 at one end of the cable. These signals are attenuated and filtered by the respective conductor means 6 over which the transmission occurs. The repeater 4, which is integral in the cable, reconstructs and retransmits respective corresponding data signals by differentiating what it receives and by then driving the respective conductor means 10 through line drivers actuated by the resultant differentiated signals. At the other end of the cable, the receiver of that transceiver 2 reconstructs the signals which have been attenuated and filtered by the conductor means 10, and these reconstructed signals are transferred to a data acquisition unit or other device to which that end of the cable is connected.

Two particular embodiments of the cable illustrated in FIG. 1 will be described with reference to FIGS. 2-3 and 4-6. Both of these have elements common to those shown in FIG. 1 as indicated by the use of the same reference numerals. Each of these particular embodiments additionally includes seismic signal conductor means 12, extending between the ends of the cable, for connecting to a plurality of geophones (not shown) along the length of the cable. Each particular embodiment also includes telephone signal conductor means 14, extending between the ends of the cable, for providing a telephone circuit between the ends of the cable and for connecting to telephone. These are generally depicted in FIGS. 3 and 5 and more particularly illustrated in FIG. 6 as will be further described hereinbelow.

To more particularly describe the embodiments, reference will first be made to the one shown in FIGS. 2 and 3. Referring to FIG. 2, the cable includes at each end a protective housing 16 made of a suitable material (e.g., polyurethane). Connected at one end of the housing 16 is a conventional Bendix connector 18 having terminals connected both to the respective transceiver 2 disposed in the housing 16 and to the conductor means 12, 14. Attached to the housing 16 for covering the connector 18 when it is not in use is a cap 19. Extending from the opposite end of the housing 16 is an outer tubular jacket 20 made of a suitable protective insulating material (e.g., polyurethane). One portion of the jacket 20 extends to a housing 22 disposed at the center of the cable. The two repeaters 4 are disposed in the housing 22. The opposite end of the cable is also constructed as just described.

Referring to FIG. 3, the repeater housing 22 includes a cylindrical sleeve 24. The sleeve 24 is held in position overlying the repeaters 4 by means of two end couplings 26. Each coupling 26 receives the end of a respective one of the sections of the outer jacket 20 so that the coupling 26 can slide therealong; however, a retaining member 28 secured to the jacket 20 prevents the coupling 26 from sliding beyond the end of the respective portion of the jacket 20 where the repeaters 4 are connected.

Sealing elements 30 are placed at the ends of the jacket 20 portions for providing a seal between the respective jacket portion and the respective end of the sleeve 24 when the housing 22 is fully assembled in the position shown in FIG. 2. In the preferred embodiments each member 30 is a polyurethane collar or ring which is attached to the jacket 20 by a suitable adhesive such as Loctite 414.

For the embodiment shown in FIG. 3, the repeaters 4 can be inserted by splicing them into the respective conductors housed in the jacket 20. This can be done to maintain the contents of the cable integral except for those conductors which are cut and connected to the repeaters 4. Alternatively, two lengths of cable, each having one end housing 16 and corresponding portion of jacket 20, can be spliced together as needed and connected to the repeater 4. The conductors 12, 14 need not be spliced across the repeater 4 junction if communications over them are to go only to their respective end housing components.

The embodiment shown in FIGS. 4 and 5 is similar to the one shown in FIGS. 2 and 3 except that the repeaters 4 are contained in their own respective housings 22 and the overall cable having the bidirectional communication capability is defined by joining the two halves apparent in FIGS. 4 and 5 by a connector 32. The connector 32 is attached so that it couples the repeater 4 of one section to the conductor 10 of the other section and so that it provides electrical continuity between the seismic signal conductor means 12 and the telephone signal conductor means 14 of the two cable sections if desired.

The various conductor means of the preferred embodiments will next be described with reference to FIG. 6, which is applicable to both of the embodiments shown in FIGS. 2-5. The data signal conductor means 6 includes a pair of conductors which in the preferred embodiments is a pair of twisted metallic wires 36, 38. In a specific implementation, the wires are 24 AWG solid metallic wires which are polypropylene jacketed. There are in effect two sets of this pair of wires, one connected between one transceiver 2 and one repeater 4 and the other connected between the other transceiver 2 and the other repeater 4.

The power conductor means 8 includes three wires 40, 42, 44. The wires 40, 42 of a specific implementation are 22 AWG stranded wires, and the wire 44 is a 24 AWG stranded wire. Each of these is respectively insulated by a suitable insulating jacket. In effect there are two sets of these wires. Each set is dedicated to one set of transceiver transmitter and repeater as shown in FIG. 1.

The data signal conductor means 10 includes a pair of twisted metallic wires 46, 48. These wires are the same type as the wires 36, 38. In effect there are two sets of the twisted pair 46, 48, namely one connected between one repeater 4 and one receiver of a transceiver 2 and the other between the other repeater 4 and the receiver of the other transceiver 2 as illustrated in FIG. 1.

The seismic signal conductor means 12 includes two bundles 12a, 12b of a plurality of pairs of twisted wires. The telephone signal conductor means 14 includes another bundle of a plurality of pairs of twisted wires. In a specific implementation, each of the wires of these pairs is a 28 AWG solid wire having a suitable insulating jacket. In the embodiment illustrated in FIG. 6, each bundle comprises three pairs of twisted wires. Any suitable plurality, n, may be used. In the illustrated embodiment, there are n(=6) pairs in the conductor means 12 and n/2(=3) pairs in each bundle; there are m(=3) pairs in the conductor means 14.

The six pairs contained in bundles 12a, 12b extend between the two ends of the cable (there can be two sets of the six pairs if each set is terminated at the location of the cable where the repeaters are connected) so that the pairs can receive connections from a plurality of geophones and conduct electrical signals from the geophones to data acquisition units or other devices connected to the ends of the cable. Such connections are diagramatically illustrated in FIG. 10. In FIG. 10, up to six geophones (not shown) can be connected to communicate with one end of the cable, and up to another six geophones can be connected to communicate with the other end of the cable. This is accomplished by severing each respective pair of wires contained in the bundles 12a, 12b and connecting the respective ends to one of the geophones in a manner as known in the art.

Figure 6:
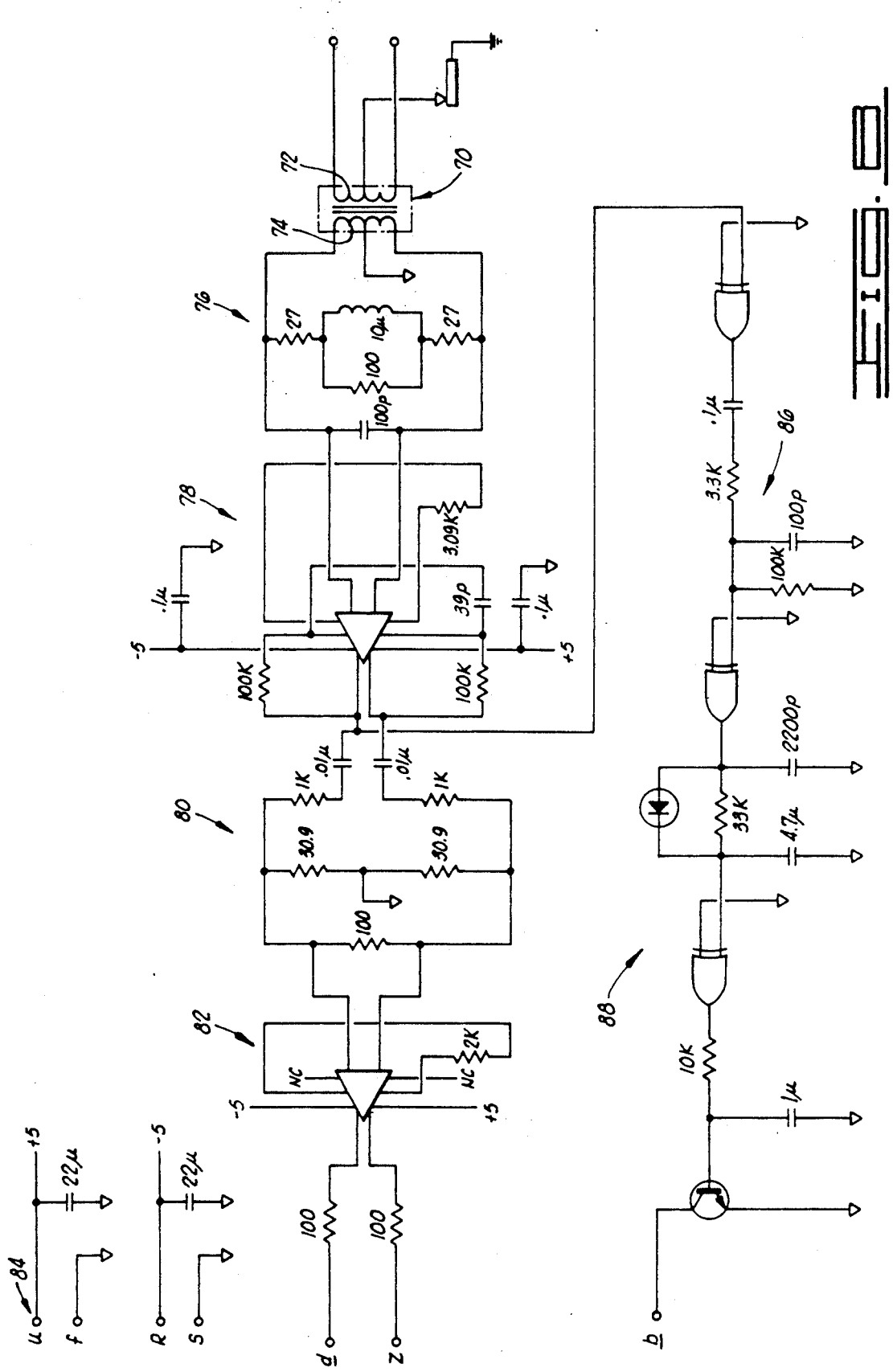
FIG. 6 is a cross sectional view taken along line 6—6 shown in FIGS. 3 and 5.

The single wires, pairs and bundles of pairs shown in FIG. 6 are contained within the jacket 20 and are supported by an axially extending support means 50 which in the illustrated embodiments is a cylindrical Kevlar member. The single wires, pairs and bundles of pairs are collectively wrapped around the support member 50 along the length of the cable. This wrapping is performed to maintain the orientation illustrated in FIG. 6 wherein the bundles 12a, 12b, 14 are substantially equiangularly spaced with the data signal conductor means 6 disposed between the bundles 12b, 14; the data signal conductor means 10 disposed between the bundles 12a, 12b; and the power conductor means 8 disposed between the bundles 12a, 14.

The data signal conductor means 6, 10 are constructed in a preferred embodiment to provide effectively low attenuation for signals having frequencies from 256 kilohertz to 8.192 megahertz. In the particular embodiment each pair 36, 38 and 46, 48 has a minimum of one twist per inch and the 24 AWG pairs have an impedance of 100 ohms, a capacitance which does not exceed 17.3 picofarads per foot, and a maximum DC resistance of 115±3% ohms for 2165 feet (660 meters) at 25° C.

Figure 7:
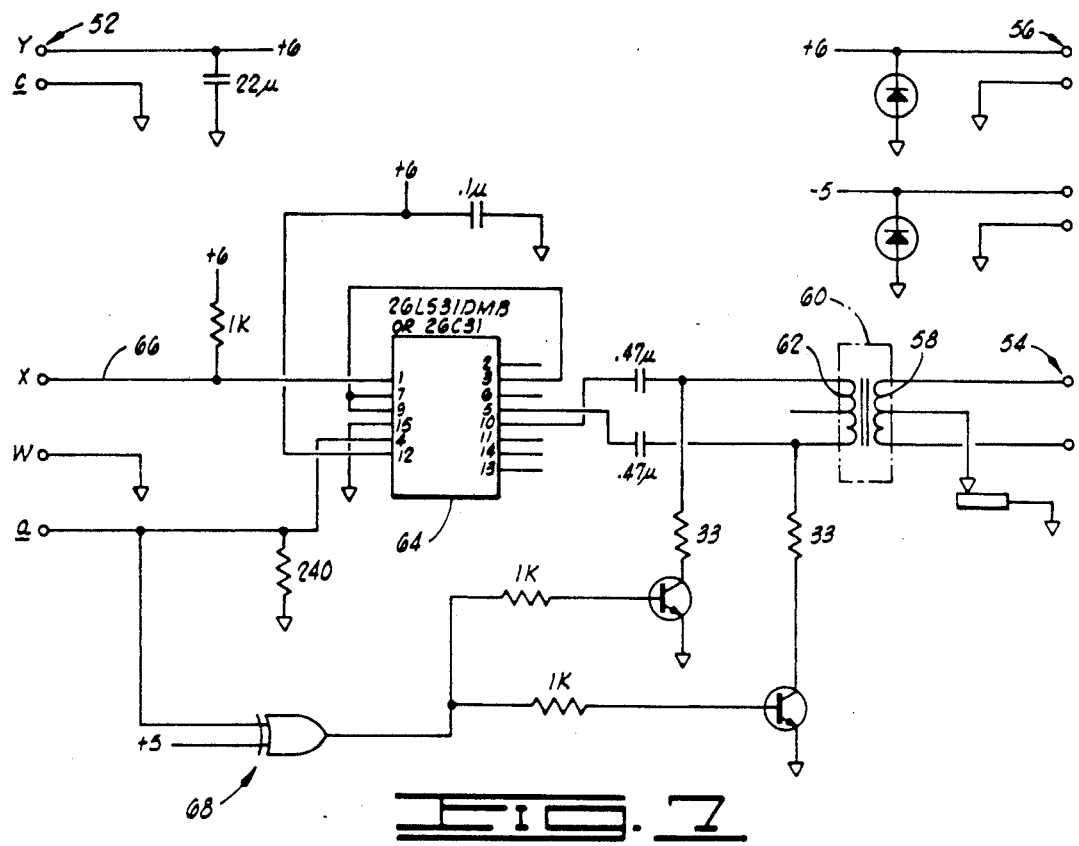
FIG. 7 is a schematic circuit diagram of a preferred embodiment of a transmitter forming a part of either of the embodiments shown in FIGS. 2-5.

Referring to FIGS. 7 and 8, the transceivers 2 will be described. Only one will be described because both have the same construction. In general, each transceiver 2 receives data transmitted from a device connected to the opposite end of the cable and transmits data to such other end. In a particular embodiment, the bandwidth of both the transmitter and receiver of the transceiver 2 is 256 kilohertz to 8.192 megahertz. Each is differentially interfaced through an isolation transformer to its respective pair of twisted wires.

The preferred embodiment of the transmitter of the transceiver 2 will be described with reference to FIG. 7. The transmitter includes terminals 52 which are connected to the respective Bendix connector 18 for connection to matching terminals of, in the particular embodiment, a conventional data acquisition unit such as in the Halliburton Services DFS-7 digital field system. The transmitter also has terminals 54 which are connected to the respective pair of twisted wires 36, 38 which define the data signal conductor means 6 illustrated in FIG. 1. The transmitter also has terminals 56 through which the +6V, −5V and common ground lines are connected to the power conductor means 8 (wires 40, 42, 44 in the illustrated embodiments) for energizing the respective repeater 4.

The terminals 54 are connected to a winding 58 of a transformer 60 which includes another winding 62 connected to an integrated circuit line driver 64. The line driver 64 drives the transformer 60 in response to digital data signals communicated to the line driver 64 over an input line 66. The transmitter also includes a control circuit 68 of a type as known in the art.

The transformer 60 is constructed to provide a wide band response. In the particular embodiment, the bandwidth is 256 kilohertz to 8.192 megahertz. Thus, in this embodiment, the transformer 60 provides a means for coupling data signals onto the data signal conductor means 6 at a frequency greater than 256 kilohertz, and more preferably at a frequency greater than 4 megahertz, but less than or equal to 8.192 megahertz.

The preferred embodiment of the receiver of the transceiver 2 is illustrated in FIG. 8. The receiver includes a transformer 70 which is constructed the same as the transformer 60 so that is has the same wide band response. A winding 72 of the transformer 70 connects to a respective one of the data signal conductor means 10 (twisted wires 46, 48). The other winding 74 of the transformer 70 is connected to a line termination circuit 76 which in turn is connected to a differentiating circuit 78. The circuit 78 detects changes in the slope of the input signal and generates a square wave in response. The output of the differentiating circuit 78 is connected to an attenuator circuit 80 which is connected to an amplifier circuit 82 which in turn provides its output to two of a plurality of terminals 84 connected to the Bendix connector 18.

The output of the differentiating circuit 78 is also connected to a filter circuit 86 which detects command signals transmitted at frequencies within the range from 256 kilohertz to 512 kilohertz. Such signals are passed through a peak detector circuit 88 which provides a signal to a control output of the terminals 84 for use by a data acquisition unit in a manner known in the art.

Figure 9:
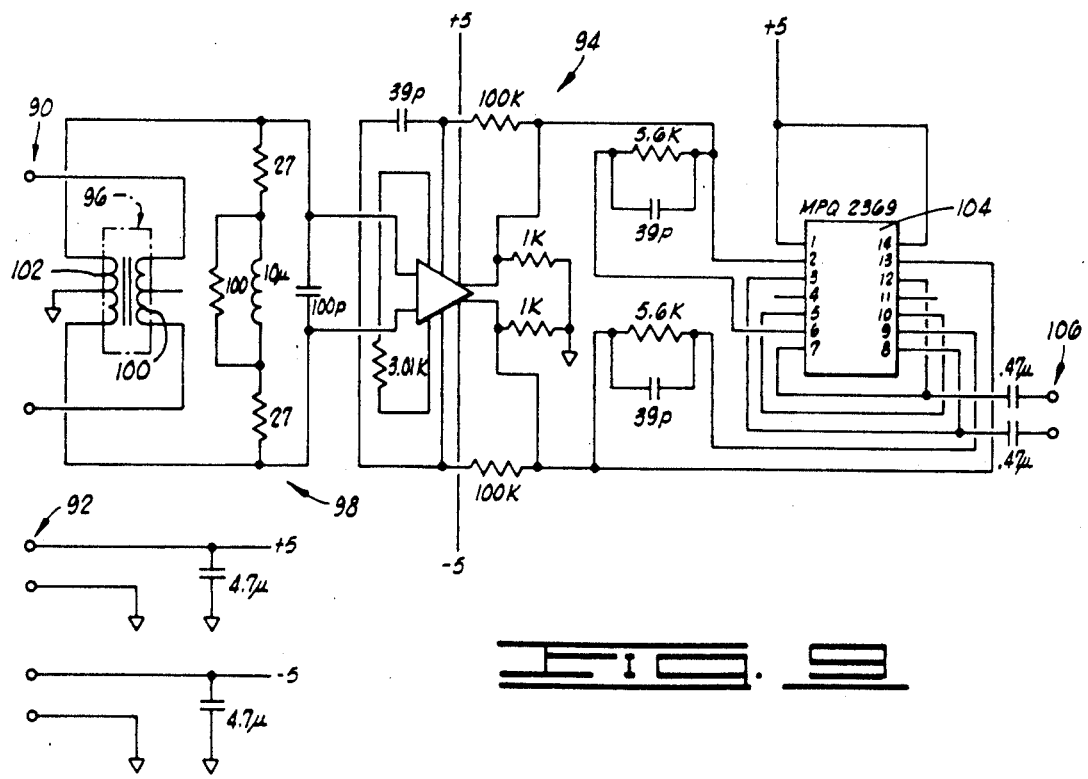
FIG. 9 is a schematic circuit diagram of a preferred embodiment of a repeater forming a part of either of the embodiments shown in FIGS. 2-5.

The preferred embodiment of each of the repeaters 4 is shown in FIG. 9. The repeaters perform the amplification and retransmissions of the signals in the middle of the cable. Each repeater 4 processes its signals differentially from input to output and handles a wide band of signals from 256 kilohertz to 8.192 megahertz. In the preferred embodiments, there are two repeaters in the middle of the cable, one for each direction. Each repeater 4 receives its power through the conductor means 8 (wires 40, 42, 44) from the end which transmits the data signals to it. This eliminates the need for repeater battery packs. For maximum isolation, there is no DC connection between the repeaters and their respective transmitters and receivers. It is contemplated that multiple repeaters can be used in any one direction to increase the maximum length of the overall cable.

The repeater 4 receives the data signals over the respective data signal conductor means 6 (wires 36, 38) through input terminals 90. Energizing electricity is received over the power conductor means 8 (wires 40, 42, 44) through terminals 92.

The data signals received through the data input terminals 90 are coupled to a differentiating circuit 94 through a transformer 96 and a line termination circuit 98. The transformer 96 has a winding 100 connected to the pair of twisted wires 36, 38 defining a respective data signal conductor means 6 in the preferred embodiment. A winding 102 of the transformer 96 is connected to the line termination circuit 98 and the differentiating circuit 94. The transformer 96 is the same type as the transformers 60, 70 so that in the particular embodiment it has a bandwidth of 256 kilohertz to 8.192 megahertz.

The output of the differentiating circuit 94 is connected to transistors contained within a quad transistor integrated circuit 104. The transistor circuit 104 has outputs connected through data output terminals 106 to the pair of twisted wires 46, 48 defining the respective data signal conductor means 10. Thus, the transistors of the circuit 104 transmit the reformed data signals through the data output 106 in response to the base terminals of the transistors being driven by the output of the differentiating circuit 94. As previously indicated, this retransmission is within the bandwidth of 256 kilohertz to 8.192 megahertz and preferably greater than 4 megahertz and most preferably at 8.192 megahertz. The differentiating circuit 94 processes data signals received from the pair of conductors of the conductor means 6 differentially from the input 90 of the repeater 4 to the output 106 of the repeater 4, which output is connected to the pair of conductors of the conductor means 10.

Referring to FIGS. 6 and 10, the operation and method of the preferred embodiments of the present invention will be described. The cable of the present invention represented by FIG. 1 is illustrated in FIG. 10 and identified by the reference numberal 108. The cable 108 is specifically implemented by either of the two preferred embodiments shown in FIGS. 2, 3, 6 and 4, 5, 6. As shown in FIG. 10, the cable 108 is connected between a conventional data acquisition unit 110a and a conventional data acquisition unit 110b which are devices known in the art of seismic prospecting.

Between the data acquisition unit 110a and the center of the cable where the repeaters 4 are located, up to 6 geophones can be connected to the six channels defined by the six pairs of twisted wires contained in bundles 12a, 12b. Likewise, up to six geophones can be connected between the data acquisition unit 110b and the center of the cable 108. In either case, analog signals generated by connected geophones are transmitted over the respective pair of twisted wires to the respective data acquisition unit. For example, a geophone connected at position 1 shown in FIG. 10 would communicate with the data acquisition unit 110a, and a geophone connected to position 12 would communicate with the data acquisition unit 110b. Even though two geophones might be connected to the same pair of twisted wires within the bundles 12a, 12b, there would be no interference because the respective pair would be cut to allow connection of the geophone so that there is not a continuous circuit to both ends of the cable once a geophone is installed. Furthermore, the cable 108 can be made so that the pairs of twisted wires in the bundles 12a, 12b, 14 are not continuous throughout the entire length of the cable but terminate where the repeaters 4 are connected, for example.

With the foregoing arrangement applied to seismic prospecting, seismic vibrations are detected by connected geophones. Detected vibrations are converted by the geophones into analog signals which are transmitted from the geophones to the respective data acquisition unit. The data acquisition unit digitizes the signal and further processes the signal if desired as known in the art. At an appropriate time, such as upon command from the opposite data acquisition unit, the digitized geophone data is transmitted in encoded format as electrical digital pulses through the respective transmitter and repeater to the receiver of the opposite end of the cable 108. In the preferred embodiment, transmission occurs within the bandwidth of 256 kilohertz to 8.192 megahertz, and preferably at a frequency greater than 4 megahertz but not greater than 8.192 megahertz, and most preferably at a frequency of 8.192 megahertz.

As the digitized signals are transmitted down the respective transmission line of the cable 108, the signals are attenuated through inherent impedance of the transmission line. The respective repeater 4 regenerates the attenuated signals by differentiating the transmitted seismic data signals through the differentiating circuit 94 which is located near the middle of the combined length of the two pairs of twisted metallic wires (36, 38 and 46, 48) of the overall transmission line of the cable 108. The repeater 4 retransmits the regenerated seismic data signals onto the pair of twisted metallic wires 46, 48 extending to the receiver at the opposite end. This retransmission includes driving the transistors of the circuit 104 with the differentiated seismic data signals.

Thus, the preferred embodiment of the present invention provides a data signal transmission cable and method through which digitized data signals can be transmitted at speeds up to 8.192 megabits per second for distances of up to at least 660 meters. This permits signal transmissions between two geophysical data acquisition units when specifically used in seismic prospecting. This permits higher transmission speeds than have been heretofore achievable when using metallic wires which are particularly suitable and acceptable to seismic prospecting.

Thus, the present invention is well adapted to carry out the objects and obtain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A data signal transmission cable, comprising:
   a data signal transmitter;
   a data signal repeater;
   data signal conductor means for conducting data signals from said transmitter to said repeater;
   power conductor means for conducting electricity from said transmitter to said repeater to energize said repeater;
   seismic signal conductor means, extending between the ends of the cable, for connecting to a plurality of geophones along the length of the cable so that signals from connected geophones are conducted therethrough to an end of the cable separately from data signals conducted through said data signal conductor means;
   telephone signal conductor means, extending between the ends of the cable, for connecting to telephones at the ends of the cable; and wherein:
   said seismic signal conductor means includes first and second bundles of a plurality of twisted pairs of wires;
   said telephone signal conductor means includes a third bundle of a plurality of twisted pairs of wires;
   said data signal conductor means includes a pair of twisted wires disposed between two of said first, second and third bundles;
   said power conductor means includes a plurality of wires disposed between a different two of said first, second and third bundles from said pair of twisted wires of said data signal conductor means;
   said transmitter includes means, connected to said data signal conductor means, for coupling data signals onto said pair of twisted wires of said data signal conductor means at a frequency greater than four megahertz; and
   said repeater includes means, connected to said pair of twisted wires of said data signal conductor means, for differentially transferring data signals at a frequency greater than four megahertz.

2. A data signal transmission cable as defined in claim 1, further comprising an axially extending support means for supporting said first, second and third bundles, said pair of twisted wires of said data signal conductor means and said plurality of wires of said power conductor means, all of which are collectively wrapped around said support means.

3. A data signal transmission cable, comprising:
   a first pair of conductors including a first pair of twisted metallic wires;
   a second pair of conductors including a second pair of twisted metallic wires;
   a third pair of conductors including a third pair of twisted metallic wires;
   a fourth pair of conductors including a fourth pair of twisted metallic wires;
   first transmitter means, disposed at a first end of the cable and connected to said first pair of conductors, for transmitting data signals over said first pair of conductors;
   first repeater means, connected to said first and second pairs of conductors, for receiving data signals from said first pair of conductors and for transmitting over said second pair of conductors in response to received data signals;
   first receiver means, disposed at a second end of the cable and connected to said second pair of conductors, for receiving data signals transmitted from said first repeater means;
   second transmitter means, disposed at the second end of the cable and connected to said third pair of conductors, for transmitting data signals over said third pair of conductors;
   second repeater means, connected to said third and fourth pairs of conductors, for receiving data signals from said third pair of conductors and for transmitting over said fourth pair of conductors in response to received data signals;
   second receiver means, disposed at the first end of the cable and connected to said fourth pair of conductors, for receiving data signals transmitted from said second repeater means; and
   wherein each of said first and second transmitter means and said first and second receiver means includes a respective transformer including a winding connected to the respective one of said first, second, third and fourth pairs of conductors, each said transformer having a bandwidth of 256 kilohertz to 8.192 megahertz. and between said second repeater means and said fourth pair of conductors so that said first and second repeater means can be disconnected from said second and fourth pairs of conductors, respectively.

4. A data signal transmission cable as defined in claim 3, wherein said first repeater means includes differentiating circuit means for processing data signals received from said first pair of conductors differentially from the input of said first repeater means connected to said first pair of conductors to the output, of said first repeater means connected to said second pair of conductors.

5. A data signal transmission cable as defined in claim 3, wherein:
   said first repeater means includes:

a first transformer, said first transformer connected to said first pair of conductors;

a first differentiating circuit, said first differentiating circuit having inputs connected to said first transformer; and a first transistor circuit, said first transistor circuit having inputs connected to the outputs of said first differentiating circuit and having outputs connected to said second pair of conductors; and said second repeater means includes:

a second transformer, said second transformer connected to said third pair of conductors;

a second differentiating circuit, said second differentiating circuit having inputs connected to said second transformer; and a second transistor circuit, said second transistor circuit having inputs connected to outputs of said second differentiating circuit and having outputs connected to said fourth pair of conductors.

6. A data signal transmission cable as defined in claim 3, further comprising:

first power conductor means, connected to said first transmitter means and said first repeater means, for conducting from said first repeater means, for conducting from said first transmitter means to said first repeater means, but not to said second repeater means, electricity for energizing said first repeater means, and second power conductor means, connected to said second transmitter means and said second repeater means, for conducting from said second transmitter means to said second repeater means, but not to said first repeater means, electricity for energizing said second repeater means.

7. A data signal transmission cable as defined in claim 3, further comprising a single housing disposed at the center of the cable, said housing having said first and second repeater means disposed therein.

8. A data signal transmission cable as defined in claim 3, further comprising a connector disposed between said first repeater means and said second pair of conductors and between said second repeater means and said fourth pair of conductors so that said first and second repeater means can be disconnected from said second and fourth pairs of conductors, respectively.

9. A data signal transmission cable, comprising:

a first pair of conductors including a first pair of twisted metallic wires;

a second pair of conductors including a second pair of twisted metallic wires;

a third pair of conductors including a third pair of twisted metallic wires;

a fourth pair of conductors including a fourth pair of twisted metallic wires;

first transmitter means, disposed at a first end of the cable and connected to said first pair of conductors, for transmitting data signals over said first pair of conductors;

first repeater means, connected to said first and second pairs of conductors, for receiving data signals from said first pair of conductors and for transmitting over said second pair of conductors in response to received data signals;

first receiver means, disposed at a second end of the cable and connected to said second pair of conductors, for receiving data signals transmitted from said first repeater means;

second transmitter means, disposed at the second end of the cable and connected to said third pair of conductors, for transmitting data signals over said third pair of conductors;

second repeater means, connected to said third and fourth pairs of conductors, for receiving data signals from said third pair of conductors and for transmitting over said fourth pair of conductors in response to received data signals;

second receiver means, disposed at the first end of the cable and connected to said fourth pair of conductors, for receiving data signals transmitted from said second repeater means; and wherein:

said first repeater means includes:

a first transformer, said first transformer connected to said first pair of conductors;

a first differentiating circuit, said first differentiating circuit having inputs connected to said first transformer; and a first transistor circuit, said first transistor circuit having inputs connected to the outputs of said first differentiating circuit and having outputs connected to said second pair of conductors;

said second repeater means includes:

a second transformer, said second transformer connected to said third pair of conductors;

a second differentiating circuit, said second differentiating circuit having inputs connected to said second transformer; and a second transistor circuit, said second transistor circuit having inputs connected to outputs of said second differentiating circuit and having outputs connected to said fourth pair of conductors; and each of said first and second transformers has a bandwidth of 256 kilohertz to 8.192 megahertz.

10. A method of communicating seismic data signals over two serial pairs of twisted metallic wires having a combined length of up to at least 660 meters, comprising:

transmitting seismic data signals from one end of a first pair of the two pairs of twisted metallic wires at a frequency of 8.192 megahertz;

differentiating the transmitted seismic data signals through a differentiating circuit located near the middle of the combines length at the other end of the first of the two pairs of twisted metallic wires; and retransmitting seismic data signals at 8.192 megahertz over the second of the two pairs of twisted metallic wires for communication to the other end of the second of the two pairs, said retransmitting including driving transistors, which are connected to the differentiating circuit and the second of the two pairs of twisted metallic wires, with the differentiated seismic data signals.

11. A seismic prospecting transmission cable for connecting two data acquisition units, the cable comprising:

first transmitter means for transmitting electrical signals at a frequency within the range from above four megahertz to 8.192 megahertz;

first connecting means for connecting said first transmitter means to one of the data acquisition units;

first repeater means for regenerating and transmitting electrical signals at a frequency within the range from above four megahertz to 8.192 megahertz in response to electrical signals transmitted by said first transmitter means;

a first pair of twisted wires connected to said first transmitter means and said first repeater means so that electrical signals transmitted by said first transmitter means are conducted to said first repeater means through said first pair of twisted wires;

first receiver means for receiving electrical signals regenerated and transmitted by said first repeater means;

second connecting means for connecting said first receiver means to the other data acquisition unit; and a second pair of twisted wires connected to said first repeater means and said first receiver means so that electrical signals regenerated and transmitted by said first repeater means are conducted to said first receiver means through said second pair of twisted wires.

12. A cable as defined in claim 11, further comprising:

second transmitter means for transmitting electrical signals at a frequency within the range from above four megahertz to 8.192 megahertz, said second transmitter means connected to said second connecting means;

second repeater means for regenerating and transmitting electrical signals at a frequency within the range from above four megahertz to 8.192 megahertz in response to electrical signals transmitted by said second transmitter means;

a third pair of twisted wires connected to said second transmitter means and said second repeater means so that electrical signals transmitted by said second transmitter means are conducted to said second repeater means through said third pair of twisted wires;

second receiver means for receiving electrical signals regenerated and transmitted by said second repeater means, said second receiver means connected to said first connecting means; and a fourth pair of twisted wires connected to said second repeater means and said second receiver means so that electrical signals regenerated and transmitted by said second repeater means are conducted to said second receiver means through said fourth pair of twisted wires.

13. A cable as defined in claim 12, further comprising:

first power conductor means, connected to said first transmitter means and said first repeater means, for conducting from said first transmitter means to said first repeater means, but not to said second repeater means, electricity for energizing said first repeater means; and second power conductor means, connected to said second transmitter means and said second repeater means, for conducting from said second transmitter means to said second repeater means, but not to said first repeater means, electricity for energizing said second repeater means.

14. A cable as defined in claim 12, further comprising seismic signal conductor means, connected to said first and second connecting means, for connecting to a plurality of geophones so that analog signals from connected geophones are conducted therethrough to one or the other of the data acquisition units for digitization by the respective data acquisition unit into electrical digital pulses and for transmission from the respective data acquisition unit of the electrical digital pulses through the respective one of said first and second transmitter means.

* * * * *